(12) United States Patent
Lee

(10) Patent No.: US 9,135,436 B2
(45) Date of Patent: Sep. 15, 2015

(54) EXECUTION STACK SECURING PROCESS

(71) Applicant: The Aerospace Corporation, El Segundo, CA (US)

(72) Inventor: Richard M. Lee, Calabasas, CA (US)

(73) Assignee: The Aerospace Corporation, El Segundo, CA (US)

( * ) Notice: Subject to any disclaimer, the term of this patent is extended or adjusted under 35 U.S.C. 154(b) by 200 days.

(21) Appl. No.: 13/656,495

(22) Filed: Oct. 19, 2012

(65) Prior Publication Data

US 2014/0115689 A1  Apr. 24, 2014

(51) Int. Cl.
 *G06F 21/53* (2013.01)
(52) U.S. Cl.
 CPC ........ *G06F 21/53* (2013.01); *G06F 2221/2113* (2013.01); *G06F 2221/2149* (2013.01)
(58) Field of Classification Search
 CPC ..... G06F 12/14; G06F 12/1491; G06F 21/53; G06F 2221/2113; G06F 2221/2149
 USPC .......................................................... 726/16
 See application file for complete search history.

(56) References Cited

U.S. PATENT DOCUMENTS

| | | | | |
|---|---|---|---|---|
| 7,392,523 B1 * | 6/2008 | Stahl et al. | ..................... | 717/177 |
| 7,984,304 B1 | 7/2011 | Waldspurger et al. | | |
| 8,214,653 B1 | 7/2012 | Marr et al. | | |
| 2002/0108044 A1 * | 8/2002 | Miyazaki et al. | ............. | 713/180 |
| 2002/0194482 A1 * | 12/2002 | Griffin et al. | ................. | 713/176 |
| 2003/0028772 A1 * | 2/2003 | Allison et al. | ................. | 713/176 |
| 2004/0177243 A1 * | 9/2004 | Worley, Jr. | ........................ | 713/2 |
| 2005/0262086 A1 * | 11/2005 | Ta et al. | ............................. | 707/9 |
| 2006/0010326 A1 * | 1/2006 | Bade et al. | ..................... | 713/176 |
| 2006/0021029 A1 * | 1/2006 | Brickell et al. | ..................... | 726/22 |
| 2007/0016766 A1 * | 1/2007 | Richmond et al. | ............ | 713/100 |
| 2007/0192864 A1 * | 8/2007 | Bryant et al. | ................... | 726/23 |
| 2008/0069347 A1 * | 3/2008 | Brown et al. | ................... | 380/45 |
| 2008/0163207 A1 * | 7/2008 | Reumann et al. | ................. | 718/1 |
| 2009/0048993 A1 * | 2/2009 | Lohrbach et al. | ................ | 706/45 |
| 2009/0144510 A1 * | 6/2009 | Wibling et al. | ............... | 711/147 |
| 2010/0211781 A1 | 8/2010 | Auradkar et al. | | |
| 2010/0250497 A1 | 9/2010 | Redlich et al. | | |
| 2010/0281273 A1 * | 11/2010 | Lee et al. | ........................ | 713/190 |
| 2010/0299313 A1 | 11/2010 | Orsini et al. | | |
| 2010/0306772 A1 * | 12/2010 | Arnold et al. | ..................... | 718/1 |
| 2010/0332593 A1 | 12/2010 | Barash et al. | | |
| 2011/0029772 A1 | 2/2011 | Fanton et al. | | |
| 2011/0047381 A1 | 2/2011 | Ganesan et al. | | |
| 2011/0087692 A1 | 4/2011 | Masone | | |
| 2011/0131275 A1 | 6/2011 | Maida-Smith et al. | | |

(Continued)

FOREIGN PATENT DOCUMENTS

WO  WO 2008073606 A2 *  6/2008  ............. H04L 29/06

OTHER PUBLICATIONS

Bottoni et al., Credentials and Beliefs in Remote Trusted Platforms Attestation, Jun. 2006, International Symposium on a World of Wireless, Mobile and Multimedia Networks, pp. 662-667.*

(Continued)

*Primary Examiner* — Kenneth Chang
(74) *Attorney, Agent, or Firm* — Leonard Patel PC

(57) ABSTRACT

An approach to securing an execution stack (or cloud architecture) is provided. For example, an image is separated into a plurality of layers to form a trusted execution stack. Each of the plurality of layers is hardened to secure key cloud components of the trusted execution stack.

19 Claims, 14 Drawing Sheets

(56) References Cited

U.S. PATENT DOCUMENTS

| | | | |
|---|---|---|---|
| 2011/0145926 A1 | 6/2011 | Dalcher et al. | |
| 2011/0202765 A1 | 8/2011 | Mcgrane et al. | |
| 2011/0246988 A1 | 10/2011 | Hui et al. | |
| 2011/0252420 A1 | 10/2011 | Tung et al. | |
| 2011/0258692 A1* | 10/2011 | Morrison et al. | 726/11 |
| 2011/0271279 A1 | 11/2011 | Pate | |
| 2012/0005724 A1 | 1/2012 | Lee | |
| 2012/0066762 A1* | 3/2012 | Todorovic | 726/22 |
| 2012/0072606 A1 | 3/2012 | Shevchenko et al. | |
| 2012/0089972 A1 | 4/2012 | Scheidel et al. | |
| 2012/0117229 A1 | 5/2012 | Van Biljon et al. | |
| 2012/0167090 A1 | 6/2012 | Hui et al. | |
| 2012/0179820 A1 | 7/2012 | Ringdahl et al. | |
| 2012/0179904 A1 | 7/2012 | Dunn et al. | |
| 2012/0179916 A1 | 7/2012 | Staker et al. | |
| 2012/0180035 A1 | 7/2012 | Poddar et al. | |
| 2013/0111587 A1* | 5/2013 | Goel et al. | 726/23 |

OTHER PUBLICATIONS

John Rowell, "A Layered Approach to Securing the Cloud: Defense in Depth", Sep. 27, 2011, 7, http://cloudcomputing.sys-con.com/node/1996257.

Rob Hirschfeld et al., "Prying the Cloud Open: Dell Crowbar & Open Stack", Jul. 2011, OSCON.

Ryan K L Ko et al., "TrustCloud: A Framework for Accountability and Trust in Cloud Computing", Jul. 7-8, 2011, 9, published and presented at the 2nd IEEE Cloud Forum for Practitioners (IEEE ICFP 2011), Washington DC.

Ulrich Greveler, "Direct Anonymous Attestation: Enhancing Cloud Service User Privacy",11, Computer Security Lab Munster University of Applied Sciences, D-48565 Steinfurt, Germany, Oct. 2011.

Wikipedia, "Cloud Computing", Jul. 18, 2012, 17, http://en.wikipedia.org/wiki/Cloud_computing.

* cited by examiner

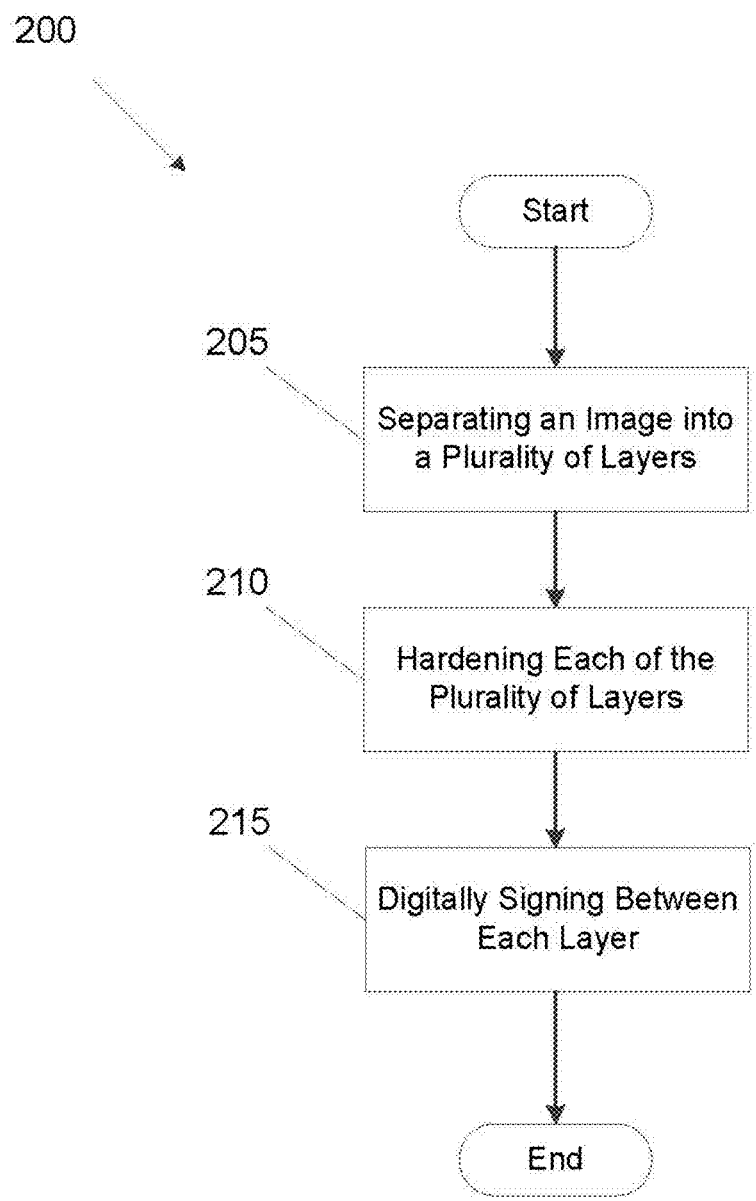

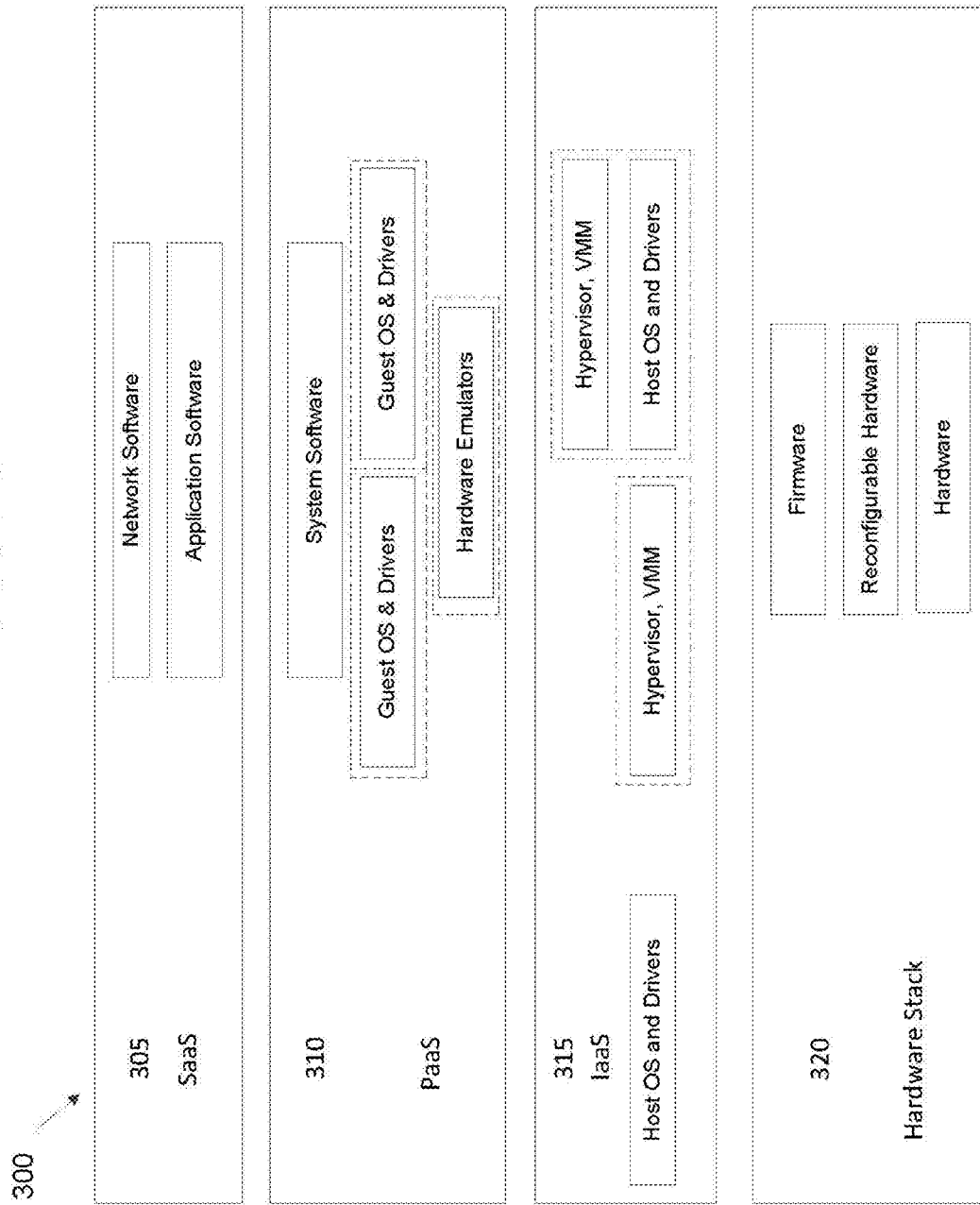

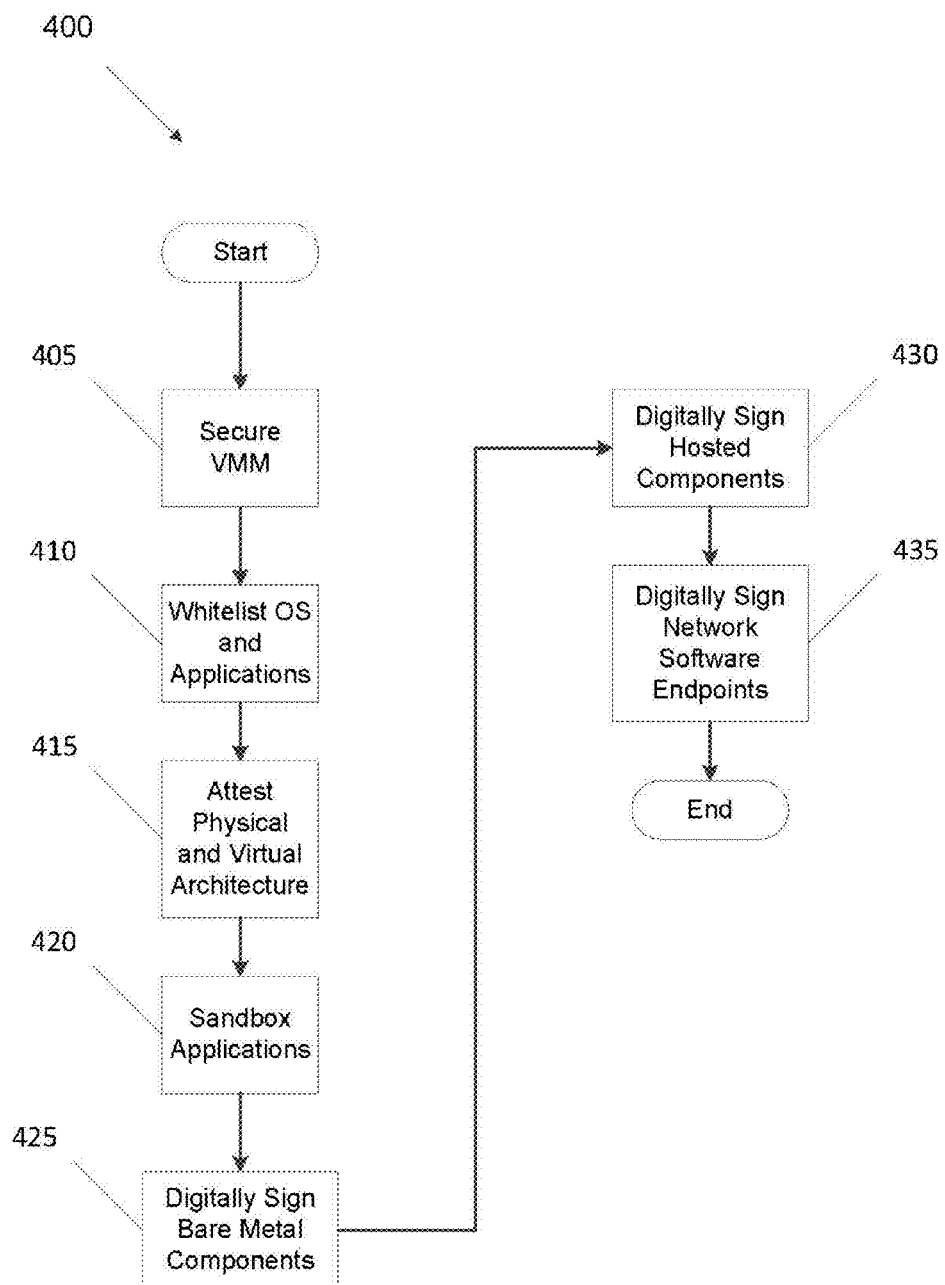

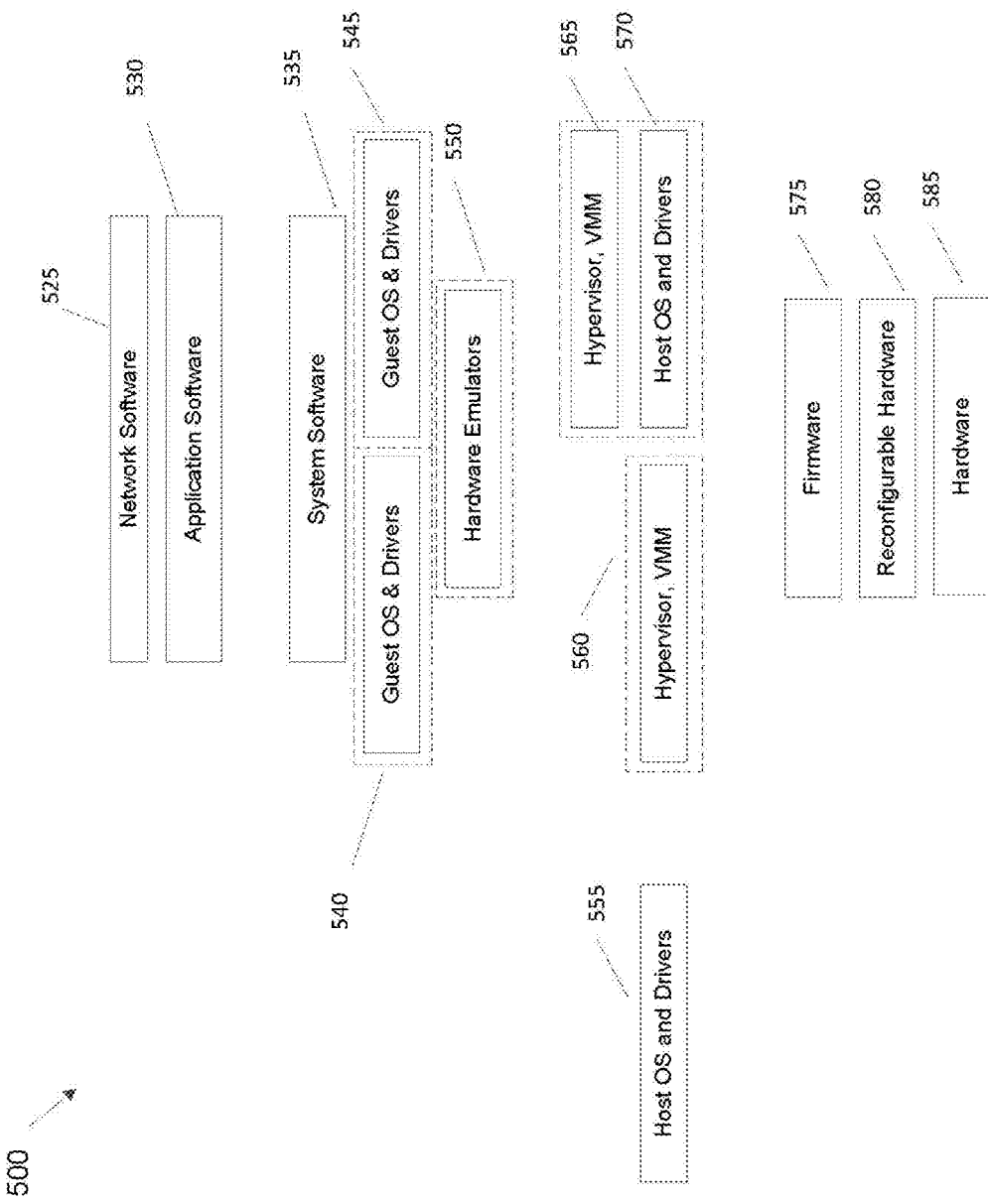

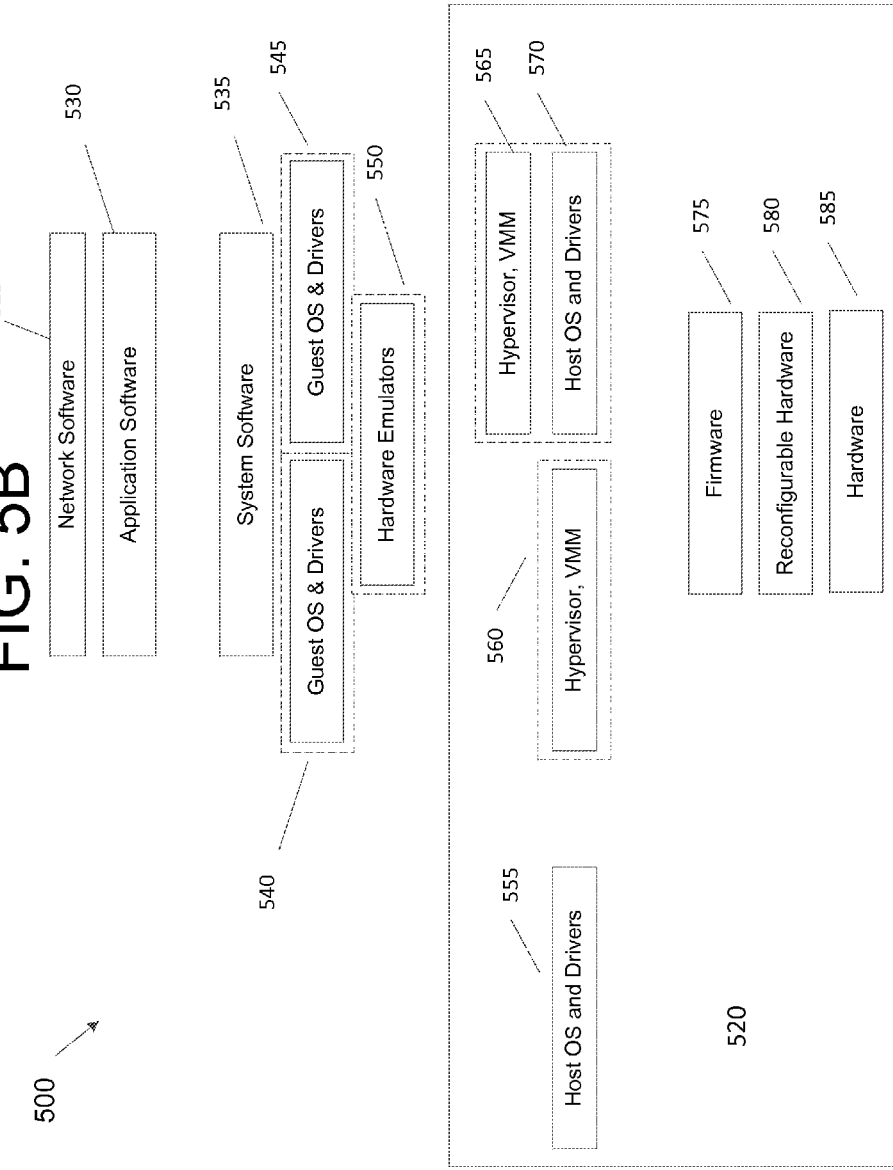

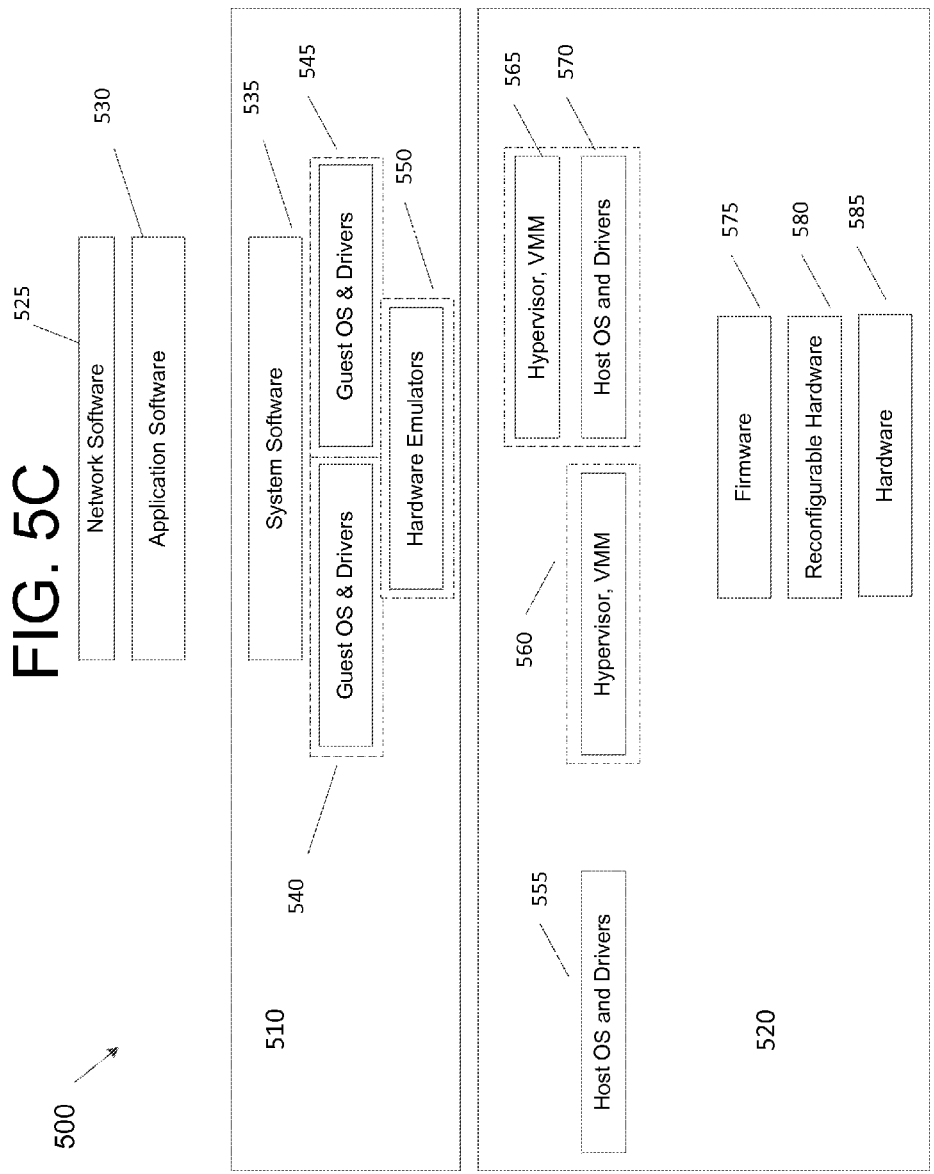

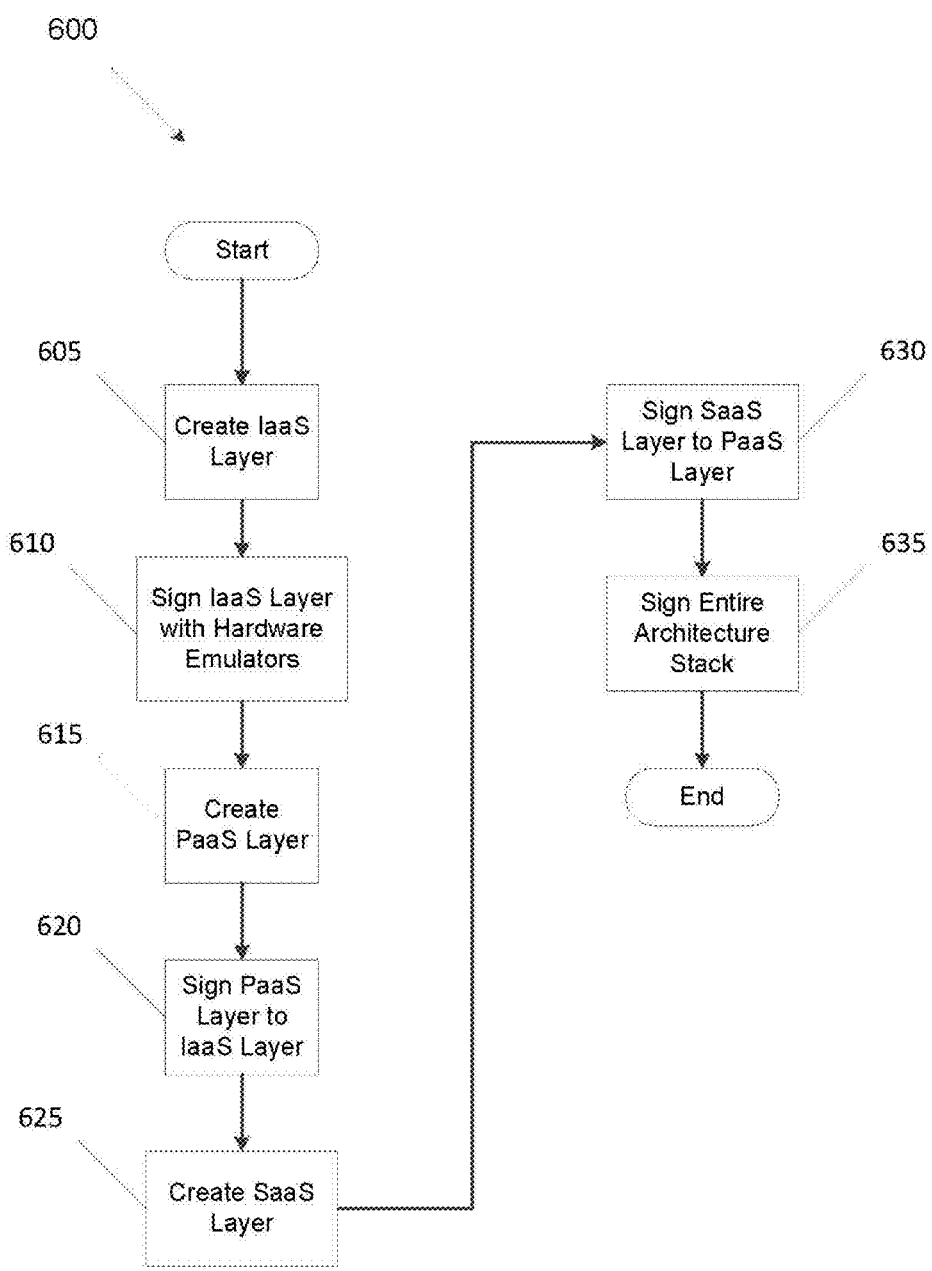

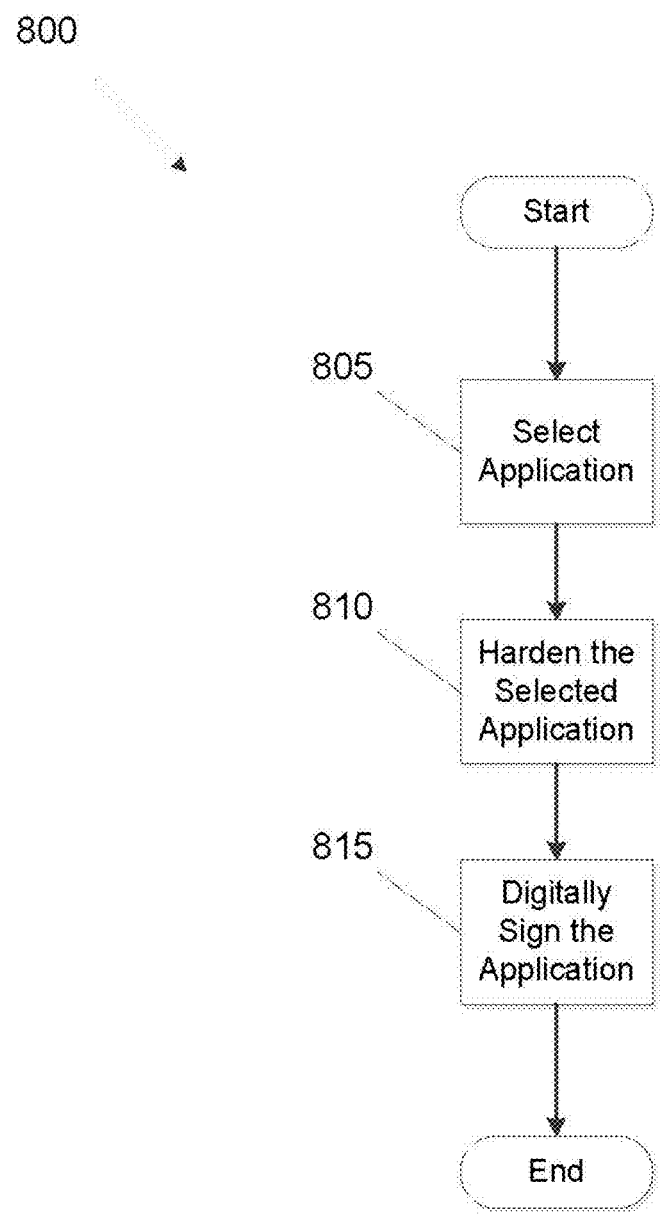

US 9,135,436 B2

EXECUTION STACK SECURING PROCESS

STATEMENT OF GOVERNMENT INTEREST

This invention was made with Government support under Contract No. FA8802-09-C-0001. The Government has certain rights in the invention.

FIELD

The present invention relates to cloud security and, more particularly, to securing data in the cloud.

BACKGROUND

Cloud computing relies on a client-server architecture. Image backups (or monolithic images) of a client computing device are taken to ensure that the client computing device can be recovered in the event of catastrophic failure. However, this approach does not scale very well because the core benefit of cloud computing is to reduce the information technology (IT) footprint. With such an approach, more and more copies of image backups are being stored on the server, cluttering the storage in the cloud. Thus, a system that reduces the required storage area may be desirable.

Furthermore, cloud computing opens up a new world of opportunities for businesses, but mixed in with these opportunities are numerous challenges that should be considered and addressed prior to committing to a cloud computing strategy. For example, some of the biggest concerns about cloud computing are privacy and security.

There are a few standard hacking methods, such as key logging and rootkits, that could compromise the privacy and security of ones' information on the cloud. Thus, a system that provides a more secure environment may be beneficial.

SUMMARY

Certain embodiments of the present invention may provide solutions to the problems and needs in the art that have not yet been fully identified, appreciated, or solved by current cloud security systems. One or more embodiments of the present invention pertain to cloud security and, in particular, to securing data to include meta data in the cloud, and a trusted, distributed execution stack. For example, one or more embodiments of the present invention provide a secure execution stack (or cloud architecture) by breaking an image of a computing device into a plurality of layers and hardening each of the plurality of layers.

In one embodiment, a computer-implemented method is provided. The computer-implemented method includes separating, by a computing device, an image into a plurality of layers to form a trusted execution stack, and hardening, by the computing device, each of the plurality of layers of the trusted execution stack.

In another embodiment, an apparatus is provided. The apparatus includes at least one processor and memory including instructions. The instructions, when executed by the at least one processor, are configured to cause the apparatus to separate an image into a plurality of layers to form a trusted execution stack, and harden each of the plurality of layers of the trusted execution stack.

In yet another embodiment, a computer-implemented method is provided. The computer-implemented method includes separating, by a computing device, an image of a device into a plurality of components to create an execution stack. The computer-implemented method also includes hardening, by the computing device, each of the plurality of components to secure the execution stack.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 is a flow diagram illustrating a process for securing the execution stack, according to an embodiment of the present invention.

FIG. 3 is a block diagram illustrating an execution stack, according to an embodiment of the present invention.

FIG. 4 is a flow diagram illustrating a process for hardening each layer of the execution stack, according to an embodiment of the present invention.

FIGS. 5A-F are block diagrams illustrating an execution stack, according to an embodiment of the present invention.

FIG. 6 is a flow diagram illustrating a process for digitally signing layers of the execution stack, according to an embodiment of the present invention.

FIG. 7 is a block diagram illustrating a digital signature of an execution stack, according to an embodiment of the present invention.

FIG. 8 is a flow diagram illustrating a process for securing an application, according to an embodiment of the present invention.

DETAILED DESCRIPTION OF THE EMBODIMENTS

One or more embodiments of the present invention provide a process to secure an execution stack. For example, the process may break down a monolithic image into separate layers including, but not limited to, hardware, host operating system, hypervisor, guest operating system, and applications. Then, each of the separate layers is hardened in order to provide a secure, and a more lean, execution stack.

Figure 1:
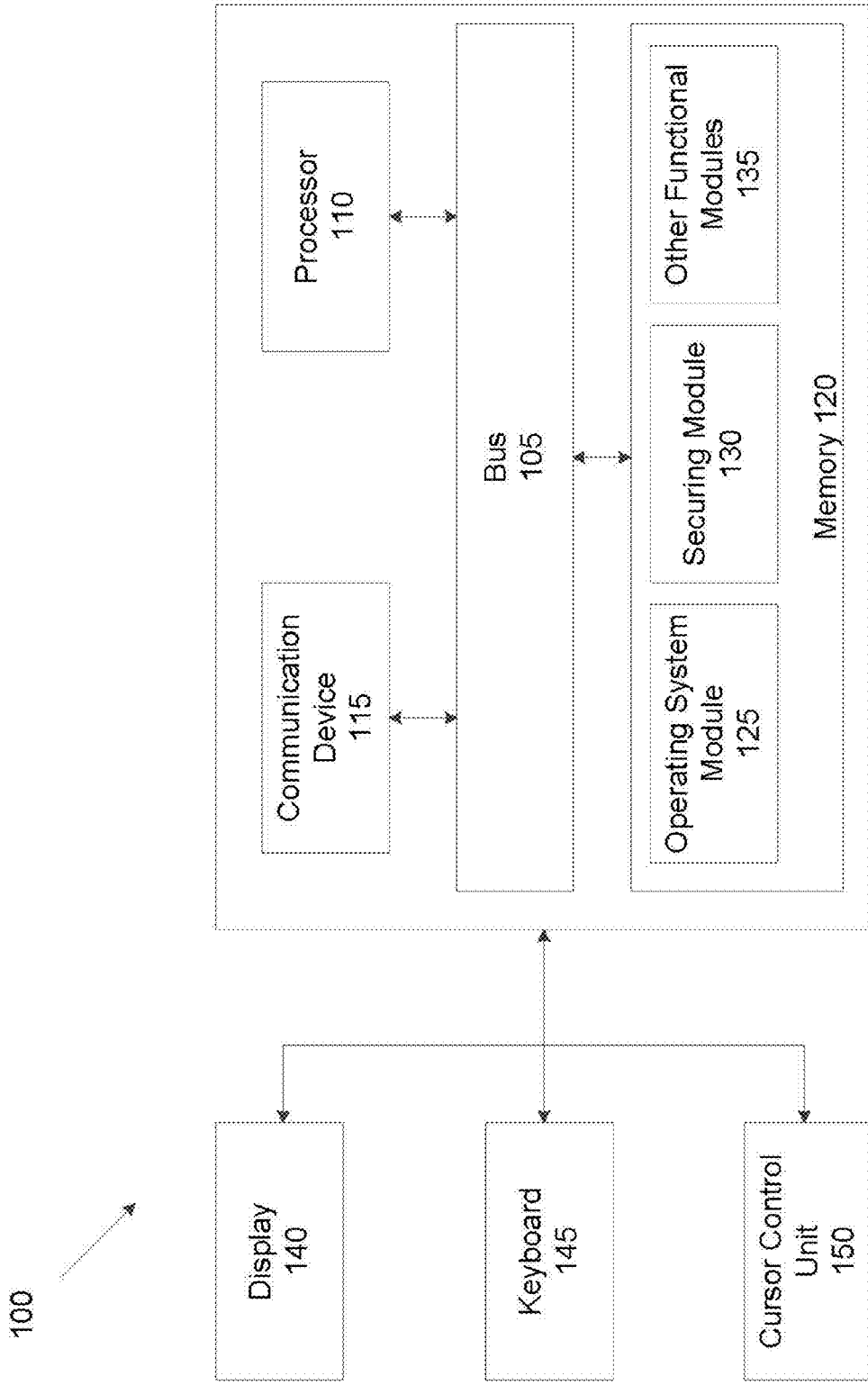
FIG. 1 is a block diagram illustrating a computing system for securing an execution stack, according to an embodiment of the present invention.

FIG. 1 is a block diagram illustrating a computing system 100 for securing an execution stack, according to an embodiment of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile media, removable and non-removable media, and communication media. The communication media may include computer readable instructions, data structures, program modules, or other data and may include any information delivery media (to include remote media via network connection, wired or wireless).

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100 (to include a keyboard video monitor (KVM) switch (local or remote), virtual or physical, and wired or wireless). Certain embodiments may not include certain components illustrated in FIG. 1, such as display 140, keyboard 145, and cursor control unit 150.

According to one embodiment, memory 120 may store software modules that may provide functionality when executed by processor 110. The modules can include an operating system 125 and a securing module 130 for securing an execution stack, as well as other functional modules 135. Operating system 125 may provide operating system functionality for system 100. Because system 100 may be part of a larger system, system 100 may include one or more additional functional modules 135 to include the additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 2 is a flow diagram illustrating a process 200 for securing an execution stack, according to an embodiment of the present invention. The computing system of FIG. 1 may, for example, execute process 200 of FIG. 2. Process 200 begins at 205 with breaking down (or separating) an image of a computing device or server into separate layers or components, such as hardware, firmware, host operating system, hypervisor, guest operation system, and applications. At 210, each of the separate layers or components is hardened. For example, attestation may be performed to the hardware and virtual machine, the host operating system, and the guest operating system, the applications may be whitelisted, the virtual machine manager or hypervisor may be secured, the applications as well as computing sessions may be encapsulated or sandboxed, and a digital signature may be added to any executables, firmware, and hardware. At 215, each of the plurality of layers are digitally bound or signed.

FIG. 3 is a block diagram illustrating an execution stack 300, according to an embodiment of the present invention. It should be appreciated that the computing system as shown in FIG. 1 may break down each of the components into a plurality of layers as shown in FIG. 3 to improve execution stack security and reduce the amount of storage required in the cloud through replication, de-duplication, diversity, and dynamic hosting of the layers across the cloud. Execution stack (or cloud architecture stack) 300 includes a plurality of layers 305, 310, 315, 320. Layer 305 may be referred as the SaaS (Software as a Service) layer, layer 310 may be referred as the platform as a service (PaaS) layer, layer 315 may be referred as the infrastructure as a service (IaaS) layer, and layer 320 may be a hardware stack. It should be appreciated that layer 320 may be the root of trust, and layers 305, 310, 315 may be the chain of trust.

In this embodiment, layer 305 includes network software and application software, and layer 310 includes system software, guest operating systems (client side and server side), and hardware emulators. Network software may include software for routers, servers, redirect, etc., and application software may include word processing software, web browsers, email, etc. System software may include services, daemons, etc., and the guest operating system may include Windows®, MAC OS X®, Linux, etc. Hardware emulators include hardware architecture, instructions, etc.

Layer 315 may include hypervisors (client side and server side), virtual machine managers (VMMs), and host operating systems and drivers. Host operating systems and drivers may include Windows®, MAC OS X®, Linux, etc. The hypervisor/VMM may include Xen, parallels, VMware, etc.

Finally, layer 320 may include firmware, reconfigurable hardware, and non-reconfigurable hardware. Firmware includes BIOS, EFI, AMT, PCI expansion ROM drivers, etc. Reconfigurable hardware includes graphical processing units, field programmable processing arrays, etc. Non-reconfigurable hardware includes processors, memory, chipsets, etc.

It should be appreciated that an execution stack 300 may be applied to both client and server architectures. For example, on the client-side, laptop computers can be extremely mobile and portable. Laptops can come in and out of the enterprise firewall. When inside the enterprise firewall, the user uses an intranet connection that is protected and controlled behind the firewall. When on the outside of the enterprise firewall, the user uses an unprotected and uncontrolled Internet connection that is outside the firewall. The unprotected and uncontrolled Internet connection that is outside the firewall exposes the user and his or her computing environment to phishing attacks, advanced persistent threats (APTs), and a plethora of cyber malware on public networks, app stores, hotspots, websites, and data stores.

While current practices typically offer point solutions, such as a virtual private network (VPN), intrusion detection systems (IDSs), encrypted devices, and authentication, many of these solutions can be defeated via keyboard loggers (i.e., "keyloggers") that can capture the password, rootkits (to circumvent the IDS or steal a user's identity), man-in-the-middle attacks (to spoof the Internet connection), and a whole host of other exploits. Thus, the process described in FIG. 2, and more fully in FIGS. 4 and 6, provides a more secure cloud computing environment than in conventional systems.

On the server side, for example, virtual machines come and go, as is the service model of cloud computing. Most enterprises use a VPN to access their intranet remotely. Once on the intranet, the requests default to trusted, and are no longer challenged. This is a concern because if the server is infected with an APT, there is a potential for the entire community to be taken offline (i.e., the proverbial multi-tenancy challenge).

Furthermore, there are maintenance challenges to keep all of the VMs up-to-date with respect to patch management and controlled deployments across the cloud enterprise. Thus, the execution stack shown in FIG. 3 addresses the concerns discussed above by providing a process to centrally manage the plurality of layers.

To secure the execution stack shown in FIG. 3, a hardening process is carried out by, for example, a computing system such as that shown in FIG. 1. FIG. 4 is a flow diagram illustrating a process 400 for hardening each layer of an execution stack, according to an embodiment of the present invention. It should be appreciated that the block diagram illustrating an execution stack 500, as shown in FIG. 5A, is discussed concurrently with process 400 of FIG. 4. In certain embodiments, each layer of execution stack 500 may be hardened simultaneously or in any sequentially order. Stated differently, process 300, as shown in FIG. 3, may be executed in any order or simultaneously depending on configuration of execution stack 500.

Process 400 begins with securing at 405 at least one hypervisor (or VMM). It should be appreciated that, in some embodiments, two types of virtualization may need to be secured, e.g., bare metal and hosted. In a bare metal architecture, hypervisor (or hypervisor, VMM) 560 may run directly on top of the hardware stack, i.e., firmware 575, reconfigurable hardware 580, and hardware 585. Hypervisor 560 may take on the role of a host operating system 555 and support one or more guest operating systems and drivers (hereinafter guest operating systems) 540, 545, which support one or more different applications (e.g., network software 525 and/or application software 530). It should be appreciated that guest operating system 540 may be a virtual machine running Windows® and guest operating system 545 may be a virtual machine running Linux®. Once virtualization is enabled, any guest operating system can simultaneously run in a virtualized environment. The hardening approached described herein may be simultaneously applied to any operating system in singularity or in multitude. The number and diversity of guest operating systems that can be run simultaneously may be limited by the central processing unit and the random access memory available.

In a hosted architecture, host operating system and drivers (hereinafter host operating system) 555 runs directly on top of the hardware stack. However, an additional hypervisor (or hypervisor, VMM) 565 may support one or more guest operating systems 540, 545 (having different operating systems) and support one or more different applications. The securing of the VMM may prevent a rogue hypervisor from taking complete control of a server, and prevent an intruder from controlling any one of hypervisors 560, 565 in execution stack 500.

At 410, the components, such as host operating system 555 and guest operating system 540, as well as host operating system and drivers (hereinafter host operating system) 570 and guest operating system 545, are whitelisted to protect the operating system and application software 530. It should also be appreciated that application software 530 associated with the operating systems is also whitelisted. By whitelisting the above components, other components that are not registered on the white list are prevented from accessing, or executing on, the cloud. Whitelist, in this embodiment, may be a list of entities that are being provided a particular privilege, access, etc.

At 415, attestation or remote attestation is utilized to authenticate the physical architecture (client-side and/or server-side execution stack due to client-side and/or server-side trusted platform module (TPM) architecture) and virtual architecture (bare metal architecture, and hosted architecture via virtual TPM). Stated differently, through attestation, the components in the physical architecture and/or virtual architecture can be verified or certified. It should be appreciated that the physical architecture and the virtual architecture may be attested simultaneously or in any sequential order. For the client-side and/or server-side execution stack (e.g. physical), the following components may be attested: firmware 575, reconfigurable hardware 580, hardware (non-reconfigurable) 585, and host operating systems 555, 570. For bare metal architecture, the following components may be attested: guest operating system 540, hardware emulator 550, and hypervisor 560. For hosted architecture, the following components may be attested: guest operating system 545, hardware emulators 550, and hypervisor 565. By attesting such components, execution stack 500 may be protected by detecting changes to the computing environments.

At 420, components, such as application software 530, are sandboxed to protect the execution stack by confining changes to the computing environment. Stated differently, sandboxing is a security mechanism for separating application (or running programs). At 425, bare metal components of execution stack 500 of FIG. 5 are digitally signed to ensure, for example, that an electronic document is authentic. In a bare metal architecture, for example, the following components may be digitally signed: network software 525, application software 530, system software 535, guest operating system 540, hardware emulators 550, hypervisor 560, and firmware 575. By digitally signing each layer to the next layer, each layer in the execution stack will be authenticated in order for the layers to load or execute. Thus, by signing each layer to the next, a user can have a degree of confidence that the entire execution stack has been authenticated.

At 430, hosted components are also digitally signed in the execution stack. Such components may include, for example, network software 525, application software 530, system software 535, guest operating system 545, hardware emulators 550, hypervisor 565, host operating system 570, and firmware 575. Digitally signing each layer to the next layer causes the execution stack to be authenticated and loaded. Thus, by signing each layer to the next layer, the user has a degree of confidence that the entire execution stack has been authenticated.

At 435, a digital signature is also applied to a client-server network layer having network software 525, i.e., digitally signing network software end points. This may allow for a secure connection between the client and server execution stack.

FIG. 6 is a flow diagram of a process 600 for digitally signing layers of the execution stack, according to an embodiment of the present invention. It should be appreciated that the block diagrams illustrating execution stack 500 of FIGS. 5B-E are discussed concurrently with process 600 of FIG. 6.

In certain embodiments, to provide an extra layer of protection, the following process may be executed. At 605, a logical group 520 is created to represent an IaaS layer (or IaaS layer with a hardware stack) by grouping a traditional client, bare metal hypervisor, and hosted hypervisor (see FIG. 5B, for example). The traditional client may include hosted operating system 555, firmware 575, reconfigurable hardware 580, and hardware 585. The bare metal hypervisor may include hypervisor 560, firmware 575, reconfigurable hardware 580, and hardware 585. The hosted hypervisor may include hypervisor 565, firmware 575, reconfigurable hardware 580, and hardware 585. At 610, logical group 520 is signed with hardware emulators 550 using a digital signature.

At 615, a logical group 510 (i.e., a PaaS layer) is created to represent the PaaS layer by grouping a bare metal hypervisor and a hosted hypervisor (see FIG. 5C, for example). The bare metal hypervisor may include system software 535, guest operating system 540, and hardware emulators 550. The hosted hypervisor may include system software 535, guest operating system 545, and hardware emulators 550. At 620, logical group 510 can be digitally signed to logical group 520 using a digital signature.

Figure 5D:
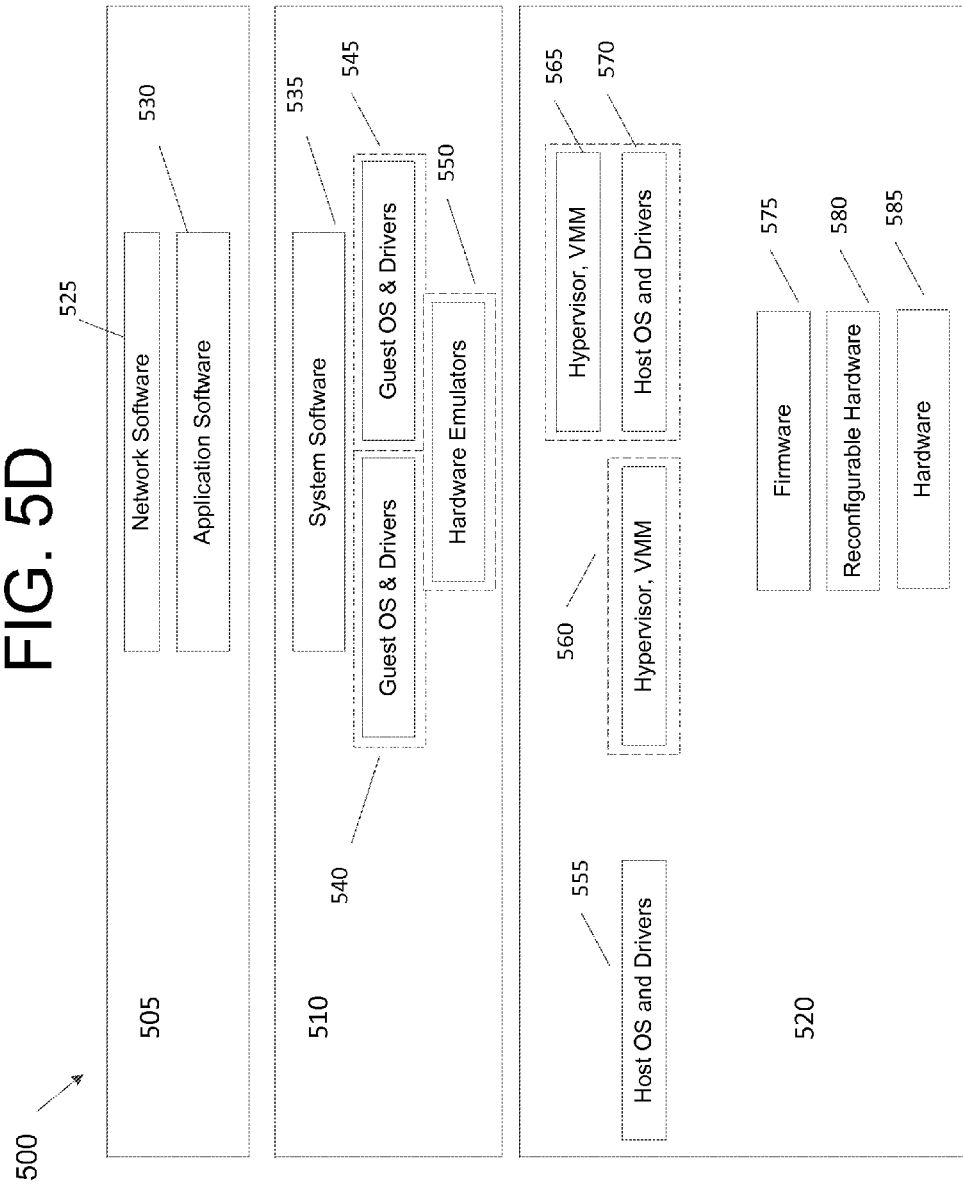
Figure 5E:
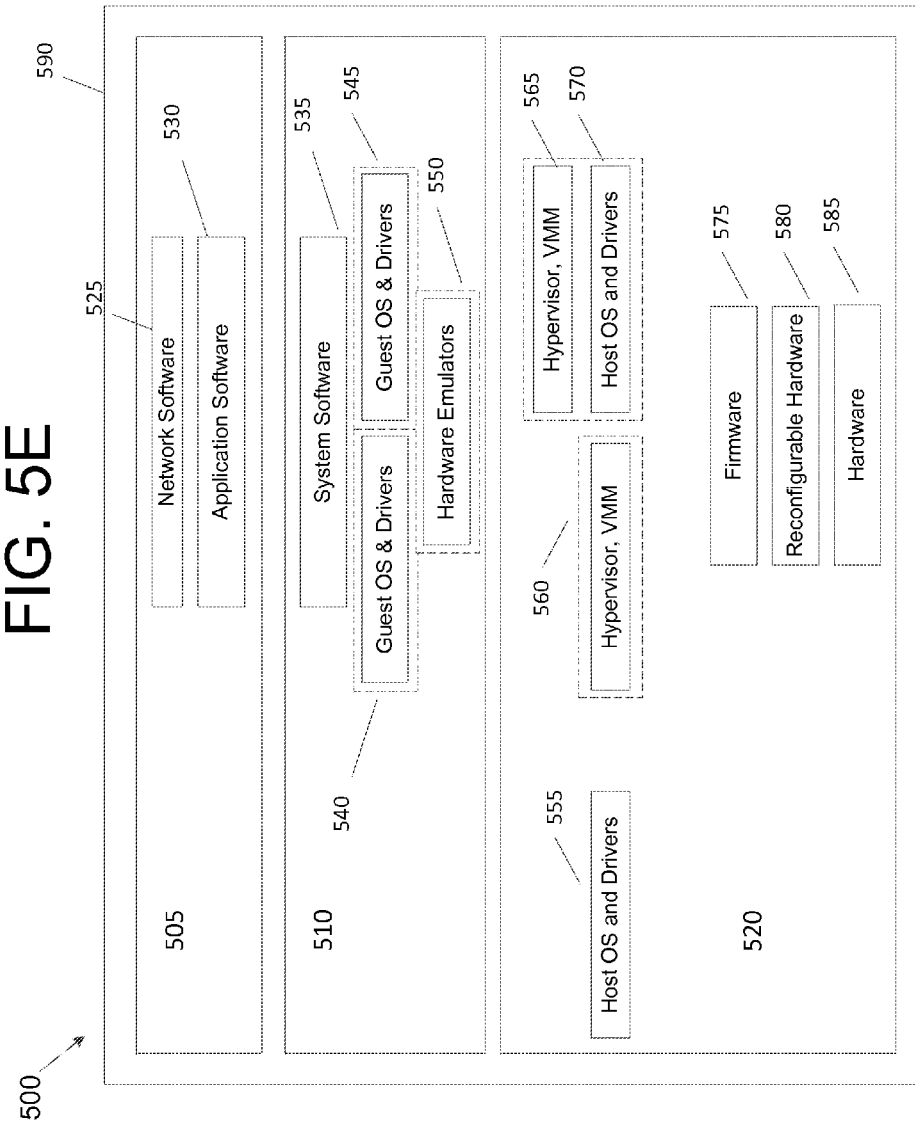

At 625, a logical group 505 (i.e., a SaaS layer) is created to represent the SaaS layer by grouping network software 525 and application software 530 (see FIG. 5D, for example). At 630, logical group 505 can be digitally signed to logical group 510 using a digital signature. This process ensures that each layer in execution stack 500 has been authenticated in the execution stack. In certain embodiments, an enterprise digital signature can be used at 635 to digitally sign entire execution stack 590 (See FIG. 5E, for example). In this embodiment, it should be appreciated that execution stack 500 may be the entire trusted execution stack in its entirety, and stack 590 may represent each layer that is digitally signed and bound. Stated differently, by digitally signing entire execution stack 590, one final signature can be applied across the entire enterprise layer as a multitude of signatures to ensure that all of the layers/components are signed and trusted.

Figure 5F:
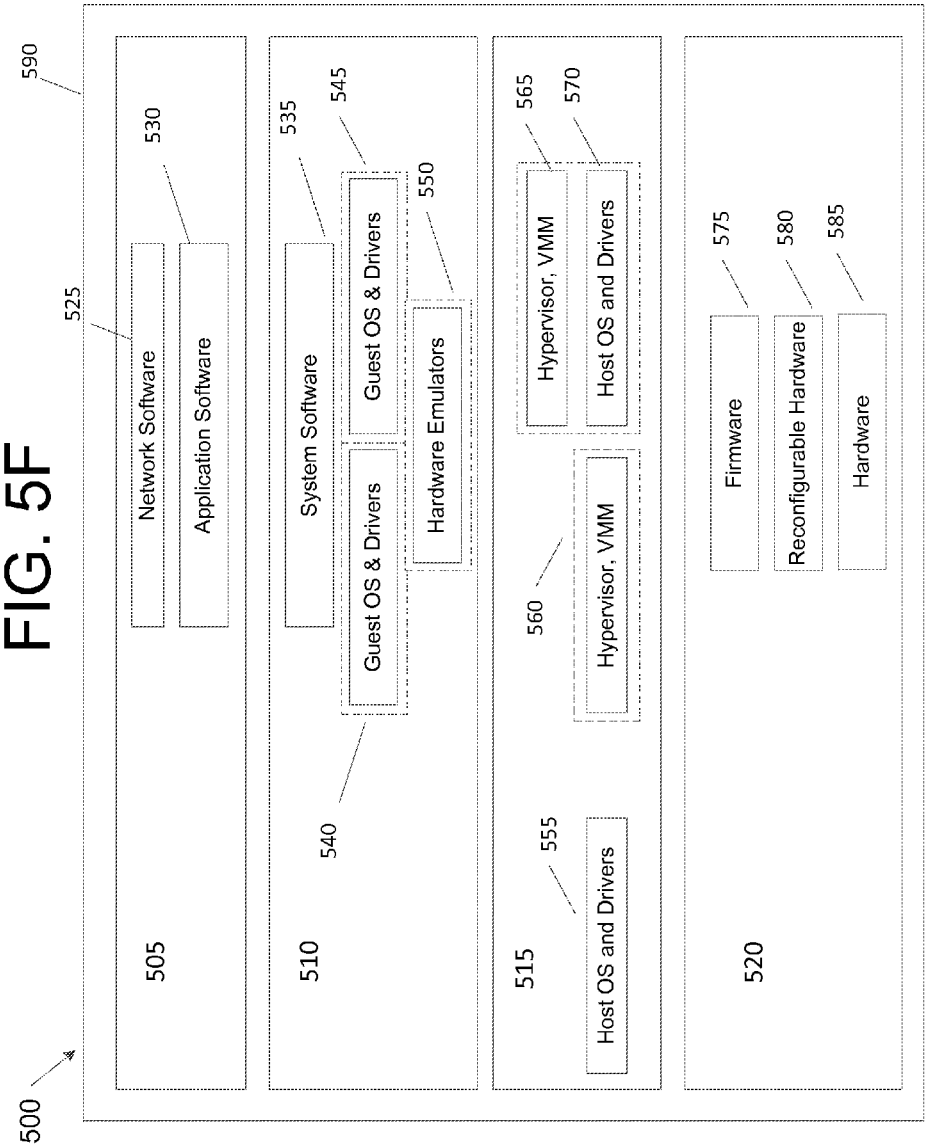

FIG. 5F is a block diagram illustrating an execution stack 500, according to an embodiment of the present invention. This embodiment shows additional logical groupings that can be digitally signed to bind executables together and create additional layers of protection. For example, each application (e.g., network software 525 and application software 530) can be combined and digitally signed into SaaS layer 505. By making such a group, the applications can be whitelisted and sandboxed into their respective SaaS layer 505 such that those applications will be allowed to load and execute in a given cloud environment, and any other application may be treated as malware.

This can enable an application store, for example, to bundle a set of approved applications such that the user can access the applications from any cloud infrastructure. An application store may include an entire trusted executed stack or any component or layer of the trusted execution stack. Bundles can be configured and controlled throughout the enterprise to ensure consistency and uniformity. Moreover, the flexibility to download any number of temporary applications from the application store, or even the Internet, into a user's respective sandboxed environment(s) can also be accomplished without the need for root administration access.

Additionally, some sandboxing techniques also enable agentless application virtualization to become self-installing independent of the operating systems 540, 555, as well as run the applications in isolation from each other. Furthermore, digitally signing across logical groupings can tether an application store to a signed execution stack (e.g., execution stack 500) in a cloud-agnostic, distributed (local or remote) manner without sacrificing flexibility or accessibility.

System software 535, guest operating systems 540, 545, and hardware emulator 550 can be combined and digitally signed into a PaaS layer 510. By making this grouping, system software 535, guest operating systems 540, 545, and hardware emulators 550 can be whitelisted and sandboxed to further constrain which hardware emulator and guest operating system can execute on the signed execution stack. Likewise, digitally signing across logical groupings can tether PaaS layer 510 to the signed execution stack in a cloud-agnostic, distributed (local or remote) manner without sacrificing flexibility or accessibility.

Similarly, traditional host operating system 555, bare metal hypervisor 560, hosted hypervisor 565, and host operating system 570 can be combined and digitally signed into IaaS Layer 515. By making this logical grouping, a traditional host operating system 555, bare metal hypervisor 560, hosted hypervisor 565, and host operating system 570 can be configured and contained for a specific execution stack instance. Likewise, digitally signing across logical groupings can tether IaaS layer 515 to the signed execution stack in a cloud-agnostic, distributed (local or remote) manner without sacrificing flexibility or accessibility.

By definition, only certain combinations of IaaS and PaaS groupings can be supported by design, e.g., a traditional host operating system 555 does not involve any virtualization. Therefore, no virtualized components (i.e. hypervisors 560, 565, guest operating systems 540, 545, or hardware emulator 550) would be required. However, this does not preclude deploying a virtualized environment onto a stand-alone client computer. The plurality of layers enables local or remote booting of trusted executing layers onto commodity hardware stack 520.

The last logical grouping is hardware stack 520. This is generally vendor-specific as central processing units (CPUs), RAM, drivers, and firmware tend to be very vendor/manufacturer-dependent. By making this grouping, firmware 575, reconfigurable hardware 580, and hardware 585 make up the specific instance of hardware stack 520. The attestation process can seal and authenticate the hardware environment, and the BIOS (e.g., firmware 575) can be additionally signed to bind to IaaS Layer 515, as well as to prevent inadvertent or malicious replacement (flashing or replacement) of the BIOS or hardware components.

Commodity hardware configurations, by vendor and manufacturer, could be certified or approved, perhaps by respective U.S. government agencies, to be evaluated to a certain trust level for a specific configuration. By creating a database of these commodity hardware configurations and their respective 'trust levels', a repository of available cloud resources of trusted hardware stacks 520 could be developed.

This, in turn, can be made available as a root-of-trust to cloud enterprises to build a trusted execution stack.

It should be appreciated that the overall execution stack can be digitally signed to encrypt and authenticate the overall image of the computing device or server. This image can be further partitioned into other logical subgroups: SaaS 505, PaaS 510, IaaS 515, and hardware stack 520. It should be noted that to build a trusted execution stack, a root-of-trust may have to be established. Because a trusted hard stack 520 exists on both the client side and server side of the client-server execution stack, a cross-platform, physical basis is formed for an execution stack to build upon.

Because the BIOS can be used to boot the computing device in various ways, by digitally signing the BIOS (e.g., firmware 575), a specific operating system can be loaded and unauthorized boot processes may be prevented.

In certain embodiments, the computing device can be booted using a Wake-on-LAN (local area network) command and pre-execution environment (PXE) that allows the computing device to be turned on or woken up by a network message. Because the BIOS is digitally signed, the computing device can be updated or booted using an authenticated server, and be bound to a specific, signed operating system from IaaS layer 515. This prevents vectoring of the boot process to an unauthorized operating system. Other vectoring techniques may include active management technology (AMT), and intelligent platform management interface (IPMI).

Regardless of how the operating system in IaaS layer 515 is invoked, embodiments of the present invention may not require that the operating systems in IaaS layer 515 be collocated with the physical hardware. In fact, in order to support cloud computing, it is generally advantageous to host the operating system either locally or remotely and to host many instances of the execution stack simultaneously or independently from each other.

If a virtualized environment is utilized (e.g., hypervisors 560, 565 or host operating system 570), a bare metal or hosted virtual machine (e.g., hardware emulators 550, guest operating systems 540, 545, or system software 535) may be required, which can host the guest operating system 540. Generally, the virtual machine can host many instances of the execution stack simultaneously or independently from each other, either locally or remotely.

Finally, applications, such as network software 525 and application software 530, can also be virtualized by using sandboxing techniques to confine and isolate potentially harmful programs, and generally separate running programs. Again, these applications can be either executed locally (client-side) or remotely (server-side), and executed simultaneously or independently from each other.

By making these logical groupings, it should be evident that the trusted common execution stack can be maintained while supporting a scalable, distributed, and secure method to individually protect the key components, as well as additively protect logical groupings of components to mirror the respective cloud service models.

FIG. 7 is a block diagram illustrating a digital signature 700 of a client-server execution stack, according to an embodiment of the present invention. In this embodiment, client execution stack 705 is signed with server side execution stack 710 using a digital signature to provide an extra level of protection when executing each of the stacks either simultaneously or sequentially.

In certain embodiments, an application store may store various software applications, such as word processing applications, gaming applications, etc. While current applications are not based on a trusted execution stack, it may be beneficial to secure the application by leveraging the trusted execution stack. The result would be transparent to the consumer of the application store, but would require a back end server, for example, to be application-aware (i.e., the application may include metadata to identify that the application is secure and identify the infrastructure (e.g., Mac OS®, Windows®, etc.) that the application requires).

Figure 9:
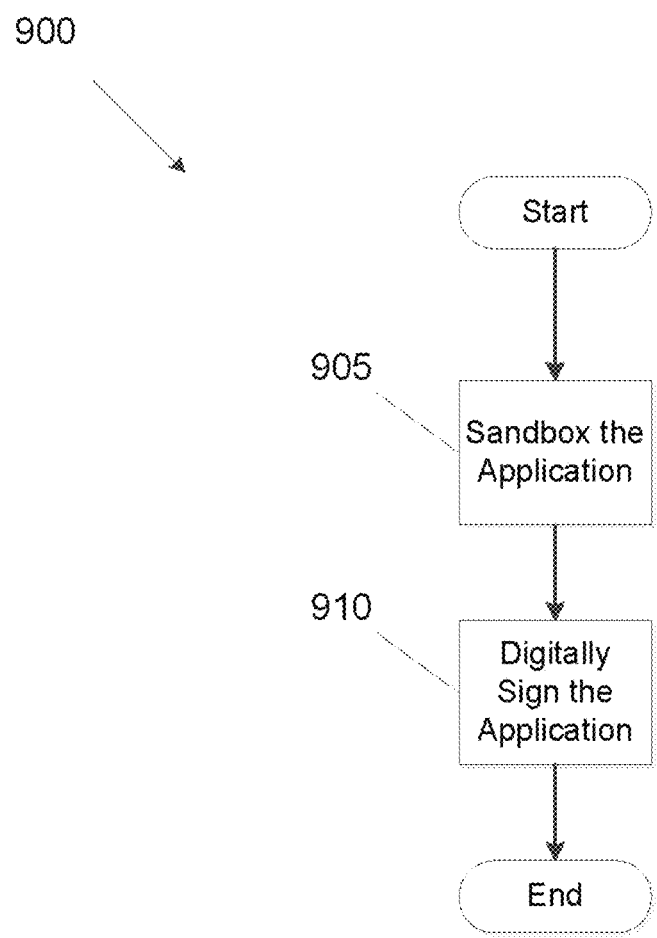
FIG. 9 is a flow diagram illustrating a process for hardening an application, according to an embodiment of the present invention.

FIG. 8, for example, is a flow diagram illustrating a process 800 for securing an application, according to an embodiment of the present invention. It should be appreciated that, in some embodiments, the computing system of FIG. 1, or any suitable computing system, may execute process 800. Process 800 begins with selecting at 805 an application stored in the application store or an application that is to be stored in the application store. At 810, the application is hardened using, for example, process 900 of FIG. 9 described below. In one embodiment, process 900 begins with sandboxing the application at 905. In other embodiments, the application may not only be sandboxed, but may also be whitelisted. At 910, the application is digitally signed. A person of ordinary skill in the art would readily appreciate that the hardening process is not limited to the process of FIG. 9, but any combination of the hardening elements, as described herein, may be utilized.

Returning to FIG. 8, at 815, the application is digitally signed to a client-side and/or a server-side execution stack. The application may be digitally signed to an appropriate execution stack based on the metadata included in the application. For example, if the metadata indicates that the operating system should be Windows®, the application may be digitally signed to an execution stack that includes a Windows® operating system. In another example, if the metadata indicates that the execution stack should be on the server-side, the application may be digitally signed to a server-side execution stack. Stated differently, depending on the metadata, the application may be digitally signed or bound to the appropriate execution stack.

It should be appreciated that there will generally be no noticeable user interface changes. The user may click on the application from the application store and the application may be launched accordingly. All processes are carried out on the back end. The user interface is not necessarily limited to point and click, but may also support a short message service (SMS) message interface in the event an internet connection is not available. For example, the trusted execution stack, either locally or remotely hosted, ensures that the entire execution environment is secure during the user's session. The process described in FIGS. 8 and 9 may also allow any application to run on any platform, e.g., a Mac OS® application may run on a Windows® environment via virtualization.

Using the process described above, an application may be transformed into a secure application. For example, a hardening application may be executed to secure an application using the process of FIGS. 8 and 9. In one embodiment, an application may be selected and inputted into the hardening application, and, as a result, the selected application is hardened and digitally signed with a trusted execution stack.

It may be beneficial to create a trusted execution stack standard in some embodiments to allow applications to plug-and-play in any architecture that is supported by the standard. This may allow an application to indicate a trust level it requires, i.e., in its metadata, for it to be hosted upon a trusted execution stack. As a result, a centralized trust provider may always have the most hardened and up-to-date trusted execution stack available for local or remote usage.

It should be appreciated that the process shown in FIGS. 2, 4, 6, 8, and 9 may be performed, in part, by a computer program, encoding instructions for a nonlinear adaptive processor to cause at least the process described in FIGS. 2, 4, 6, 8, and 9 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 2, 4, 6, 8, and 9, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
separating, by a computing device, an image into a plurality of layers to form a trusted execution stack, each layer comprising a plurality of components combined into a logical grouping; and
hardening, by the computing device, each of the plurality of layers of the trusted execution stack, wherein
the hardening of the plurality of layers comprises digitally signing the respective logical grouping into the respective layer and applying a digital signature of each of the plurality of layers to a next layer in the plurality of layers such that each of the plurality of layers are authenticated in an order when loading the trusted execution stack, and the plurality of layers comprises hardware and software layers, and wherein
the hardening of each of the plurality of layers further comprises attesting firmware, hardware, reconfiguration hardware, hardware emulators, at least one host operating system, and at least one hypervisor.

2. The computer-implemented method of claim 1, wherein the plurality of layers further comprise a layer for hardware and firmware, a layer for host operating systems and drivers, hypervisors, and virtual machine managers, a layer for guest operating systems and drivers, hardware emulators, and system software, and a layer for application software and network software.

3. The computer-implemented method of claim 1, wherein the hardening of each of the plurality of layers comprises securing at least one virtual machine manager.

4. The computer-implemented method of claim 1, wherein the hardening of each of the plurality of layers comprises securing at least one hypervisor and a host operating system.

5. The computer-implemented method of claim 1, wherein the hardening of each of the plurality of layers comprises whitelisting a guest operating system, a host operating system, and at least one application used by the guest operating system, the host operating system, or both.

6. The computer-implemented method of claim 1, wherein the hardening of each of the plurality of layers comprises sandboxing application software to create a confined execution environment.

7. The computer-implemented method of claim 1, wherein the plurality of layers are hardened for a client device, a server, or both.

8. An apparatus, comprising:
at least one processor; and
memory comprising instructions, wherein
the instructions, when executed by the at least one processor, are configured to cause the apparatus to:
separate an image into a plurality of layers to form a trusted execution stack;
harden each of the plurality of layers of the trusted execution stack;
apply a digital signature of each of the plurality of layers to a next layer in the plurality of layers such that each of the plurality of layers are authenticated in an order when loading the trusted execution stack;
digitally sign the entire trusted execution stack by applying one final signature across an entire enterprise layer of the plurality of layers as a multitude of signatures to ensure that each individual layer is trusted in the trusted execution stack, wherein the plurality of layers comprises hardware and software layers, and
attest firmware, hardware, reconfiguration hardware, hardware emulators, at least one host operating system, and at least one hypervisor.

9. The apparatus of claim 8, wherein the plurality of layers comprise a layer for hardware and firmware, a layer for host operating systems and drivers, hypervisors, and virtual machine managers, a layer for guest operating systems and drivers, hardware emulators, and system software, and a layer for application software and network software.

10. The apparatus of claim 8, wherein the instructions, when executed by the at least one processor, are further configured to cause the apparatus to secure at least one virtual machine manager.

11. The apparatus of claim 8, wherein the instructions, when executed by the at least one processor, are further configured to cause the apparatus to secure at least one hypervisor and a host operating system.

12. The apparatus of claim 8, wherein the instructions, when executed by the at least one processor, are further configured to cause the apparatus to whitelist a guest operating system, a host operating system, and at least one application used by the guest operating system, the host operating system, or both.

13. The apparatus of claim 8, wherein the instructions, when executed by the at least one processor, are further configured to cause the apparatus to sandbox application software to create a confined execution environment.

14. The apparatus of claim 8, wherein the plurality of layers are hardened for a client device, a server, or both.

15. A computer-implemented method, comprising:
separating, by a computing device, an image of a device into a plurality of layers to create a trusted execution stack, each layer comprising a plurality of components combined into a logical grouping; and
hardening, by the computing device, each of the plurality of layers to secure the trusted execution stack, wherein the hardening of each of the plurality of layers comprises digitally signing the respective logical grouping into the respective layer and applying a digital signature of each of the plurality of layers to a next layer in the plurality of layers such that each of the plurality of layers are authenticated in an order when loading the trusted execution stack, and
the plurality of layers comprises hardware and software layers, and wherein the hardening of each of the plurality of layers comprises attesting bare metal components, hosted components, or both.

16. The computer-implemented method of claim 15, wherein the hardening of each of the plurality of layers comprises securing bare metal components, hosted components, or both.

17. The computer-implemented method of claim 15, wherein the hardening of each of the plurality of layers comprises whitelisting at least one guest operating system, at least one host operating system, and at least one application.

18. The computer-implemented method of claim 15, wherein the hardening of each of the plurality of layers comprises sandboxing at least one application to confine changes in a computing environment.

19. The computer-implemented method of claim 15, wherein the hardening of each of the plurality of layers comprises signing, using a digital signature, bare metal components, hosted components, at least one application, or any combination of the bare metal components, hosted components, and the at least one application.

* * * * *